United States Patent
Liu et al.

(10) Patent No.: US 11,139,670 B2
(45) Date of Patent: Oct. 5, 2021

(54) CHARGER CIRCUIT WITH TEMPERATURE COMPENSATION FUNCTION AND CONTROLLER CIRCUIT THEREOF

(71) Applicant: RICHTEK TECHNOLOGY CORPORATION, Zhubei (TW)

(72) Inventors: Kuo-Chi Liu, Hsinchu (TW); Chang-Yu Ho, Hsinchu (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 19 days.

(21) Appl. No.: 16/046,979

(22) Filed: Jul. 26, 2018

(65) Prior Publication Data

US 2019/0052110 A1 Feb. 14, 2019

Related U.S. Application Data

(60) Provisional application No. 62/545,151, filed on Aug. 14, 2017.

(30) Foreign Application Priority Data

Jan. 12, 2018 (CN) .......................... 201810029610.2

(51) Int. Cl.
*H02J 7/00* (2006.01)
*H02J 7/35* (2006.01)
*G05F 1/56* (2006.01)
*H01M 10/46* (2006.01)

(52) U.S. Cl.
CPC .............. *H02J 7/0091* (2013.01); *G05F 1/56* (2013.01); *H02J 7/008* (2013.01); *H02J 7/0072* (2013.01); *H02J 7/35* (2013.01); *H01M 10/465* (2013.01)

(58) Field of Classification Search
CPC .. H02J 7/0091; H02J 7/006; H02J 7/35; H02J 7/008; H02J 7/00; G05F 1/56
USPC ......................................................... 320/101
See application file for complete search history.

(56) References Cited

U.S. PATENT DOCUMENTS

| 8,093,873 | B2* | 1/2012 | Kiamilev .................. G05F 1/67 323/222 |
| 8,164,299 | B2* | 4/2012 | Dubovsky ................. G05F 1/67 320/102 |
| 9,106,105 | B2* | 8/2015 | McCaslin ............... H02J 3/381 |
| 2003/0006829 | A1* | 1/2003 | Alessandria ............ G05F 3/185 327/538 |

(Continued)

*Primary Examiner* — Richard Isla
*Assistant Examiner* — Dung V Bui
(74) *Attorney, Agent, or Firm* — Tung & Associates

(57) ABSTRACT

A charger circuit with temperature compensation function includes: a power converter, an input voltage sense circuit, an output adjustment circuit and a charging control circuit. The power converter converts an input voltage supplied from a photovoltaic power module to an output voltage. The input voltage sense circuit generates a signal related to the input voltage according to the input voltage. The output adjustment circuit generates an output adjustment signal according to the signal related to the input voltage. The charging control circuit generates a control signal according to the output adjustment signal, thereby adjusting a level of an output current supplied from the power converter. When a level of the input voltage is smaller than a predetermined voltage threshold, the power converter decreases the output current.

28 Claims, 14 Drawing Sheets

(56) References Cited

U.S. PATENT DOCUMENTS

| | | | |
|---|---|---|---|
| 2005/0168193 A1* | 8/2005 | Xiong | H02J 7/0029 |
| | | | 320/134 |
| 2007/0194759 A1* | 8/2007 | Shimizu | H02J 7/345 |
| | | | 320/166 |
| 2010/0002470 A1* | 1/2010 | Kiamilev | G05F 1/67 |
| | | | 363/16 |
| 2010/0173211 A1* | 7/2010 | Kim | H01M 8/04582 |
| | | | 429/432 |
| 2012/0042588 A1* | 2/2012 | Erickson, Jr. | H01L 31/02021 |
| | | | 52/173.3 |
| 2014/0008986 A1* | 1/2014 | Miyauchi | H02M 3/1584 |
| | | | 307/82 |
| 2014/0212289 A1* | 7/2014 | Thogersen | F03D 17/00 |
| | | | 416/146 R |
| 2015/0137606 A1* | 5/2015 | Adest | H02J 1/00 |
| | | | 307/77 |
| 2017/0048935 A1* | 2/2017 | Koo | H05B 45/37 |
| 2017/0222440 A1* | 8/2017 | Shi | H02S 50/00 |

* cited by examiner

CHARGER CIRCUIT WITH TEMPERATURE COMPENSATION FUNCTION AND CONTROLLER CIRCUIT THEREOF

CROSS REFERENCE

The present invention claims priority to U.S. 62/545,151, filed on Aug. 14, 2017, and CN 201810029610.2, filed on Jan. 12, 2018.

BACKGROUND OF THE INVENTION

Field of Invention

The present invention relates to a charger circuit with temperature compensation function and a controller circuit thereof, and in particular to such a charger circuit with temperature compensation function and controller circuit thereof, wherein a maximum power point of a photovoltaic power module can be determined without complicated calculation by means of a microprocessor and a memory, and wherein the temperature effect is well compensated.

Description of Related Art

FIG. 1A is a diagram showing voltage-current characteristic curves of a prior art photovoltaic power module under the same temperature. At the same temperature of 25° C., under different sunlight brightnesses of 1000 W/m$^2$, 800 W/m$^2$, 600 W/m$^2$, 400 W/m$^2$, 200 W/m$^2$, and 100 W/m$^2$, the voltage does not change too much, but the current changes drastically. This indicates that the output current of a photovoltaic power module is correlated to the received brightness, with a linear correlation in between.

FIG. 1B is a diagram showing voltage-current characteristic curves of a prior art photovoltaic power module under the same sunlight brightness. At the same sunlight brightness of 1000 W/m$^2$, under different temperatures, the diagram shows that when the temperature increases, the output voltage of the photovoltaic power module decreases, while the output current increases. That is, at the same sunlight brightness but under different temperatures, the output voltage of the photovoltaic power module presents a negative temperature coefficient while the output current of the photovoltaic power module presents a positive temperature coefficient.

Power is not determined by voltage or current alone, but by both. To provide maximum power by a photovoltaic power module, the photovoltaic power module needs to operate at its maximum power point (Mpp).

As shown in FIGS. 1A-1B, the maximum power point Mpp is located at a tangent point of the curves. In a photovoltaic power module, the maximum power point Mpp is not a constant, but instead, it will change depending on the sunlight brightness and the temperature. Therefore, in the prior art photovoltaic power module typically uses a microprocessor in cooperation with voltage sense and current sense, to obtain the maximum power point Mpp by complicated calculation.

U.S. Pat. No. 6,984,970 is a prior art patent that relates to the present invention.

The prior art has drawbacks in these aspects: first, the prior art requires complicated calculation by microprocessor and memory, in cooperation with frequent voltage sense and current sense. Second, due to sunlight radiation and PN junction power loss, the temperature will significantly increase in a photovoltaic power module when it is in operation. Because the temperature of the photovoltaic power module is much higher than its environment, the temperature effect on the photovoltaic power module is an important factor to be taken into consideration. However, this issue is not properly addressed in the prior art. In short, the prior art does not compensate the temperature effect of the photovoltaic power module.

In view of the above, the present invention proposes a charger circuit with temperature compensation function and controller circuit thereof, wherein a maximum power point of a photovoltaic power module can be determined without complicated calculation by means of a microprocessor and a memory, and wherein the temperature effect is well compensated.

SUMMARY OF THE INVENTION

From one perspective, the present invention provides a charger circuit with temperature compensation function, having an input terminal configured to be coupled to a photovoltaic power module and an output terminal configured to be coupled to a load, wherein the charger circuit is configured to convert an input voltage provided by the photovoltaic power module at the input terminal to an output voltage at the output terminal, the charger circuit comprising: a power converter circuit coupled between the input terminal and the output terminal, the power converter circuit being configured to convert the input voltage provided by the photovoltaic power module at the input terminal to the output voltage at the output terminal and supply an output current through the output terminal to the load; an input voltage sense circuit coupled to the input terminal, the input voltage sense circuit being configured to generate an input voltage related signal according to the input voltage; an output adjustment circuit coupled to the input voltage sense circuit, the output adjustment circuit being configured to generate an output adjustment signal according to the input voltage related signal; and a charging control circuit coupled between the power converter circuit and the output adjustment circuit, the charging control circuit being configured to generate a control signal according to the output adjustment signal, to adjust the output current supplied by the power converter circuit, wherein when the input voltage is smaller than a predetermined voltage threshold, the power converter circuit decreases the output current.

From another perspective, the present invention provides a controller circuit of a charger circuit with temperature compensation function, the charger circuit having an input terminal configured to be coupled to a photovoltaic power module and an output terminal configured to be coupled to a load, wherein the charger circuit includes a power converter circuit coupled between the input terminal and the output terminal, for converting an input voltage provided by the photovoltaic power module at the input terminal to an output voltage at the output terminal and supplying an output current through the output terminal to the load, the controller circuit comprising: an input voltage sense circuit coupled to the input terminal, the input voltage sense circuit being configured to generate an input voltage related signal according to the input voltage; an output adjustment circuit coupled to the input voltage sense circuit, the output adjustment circuit being configured to generate an output adjustment signal according to the input voltage related signal; and a charging control circuit coupled between the power converter circuit and the output adjustment circuit, the charging control circuit being configured to generate a control signal according to the output adjustment signal, to adjust the output current supplied by the power converter circuit, wherein when the input voltage is smaller than a predetermined voltage threshold, the power converter circuit is controlled to decrease the output current.

In one embodiment, the charging control circuit is configured to generate the control signal according to the output adjustment signal and further according to a level of the output current, to adjust the output current supplied by the power converter circuit.

In one embodiment, the output adjustment circuit includes: a switch configured to operate according to a relationship between the input voltage related signal and the predetermined voltage threshold; and an adjustment resistor set coupled to the switch and being configured to generate the output adjustment signal, wherein a resistance of the adjustment resistor set and a conduction level of the switch determine a level of the output adjustment signal.

In one embodiment, the charging control circuit includes: a signal amplifier circuit having one input coupled to the output adjustment circuit, the signal amplifier circuit being configured to amplify a difference between the output adjustment signal and a voltage reference, to output an output current reference; and an error amplifier circuit having one input coupled to an output of the signal amplifier circuit and another input configured to receive the output current, the error amplifier circuit being configured to amplify a difference between the output current reference and the output current to generate the control signal, for controlling the output current supplied by the power converter circuit.

In one embodiment, the output adjustment circuit is further coupled to the output terminal, and is configured to generate the output adjustment signal according to the input voltage related signal and the output voltage.

In one embodiment, the output adjustment circuit includes: a switch configured to operate according to a relationship between the input voltage related signal and the predetermined voltage threshold; and an adjustment resistor set coupled to the switch and the output terminal, and being configured to generate the output adjustment signal, wherein a resistance of the adjustment resistor set, a conduction level of the switch and a level of the output voltage determine a level of the output adjustment signal, wherein the output adjustment signal is correlated to the output voltage.

In one embodiment, the charging control circuit includes: a signal amplifier circuit having one input coupled to the output adjustment circuit, the signal amplifier circuit being configured to amplify a difference between the output adjustment signal and a voltage reference, to generate the control signal for controlling the output current supplied by the power converter circuit.

In one embodiment, when the input voltage provided by the photovoltaic power module at the input terminal is equal to or larger than the predetermined voltage threshold, the power converter circuit maintains the output current at a maximum.

In one embodiment, the predetermined voltage threshold is correlated to a conduction threshold of the switch.

In one embodiment, the switch includes a MOS transistor or a BJT, the MOS transistor or BJT having a PN junction which has a temperature coefficient that is correlated to a temperature coefficient of the photovoltaic power module such that the controller circuit compensates the temperature coefficient of the photovoltaic power module.

In one embodiment, when the input voltage provided by the photovoltaic power module at the input terminal is smaller than the predetermined voltage threshold, an equivalent resistance of the switch is controlled so that the level of the output adjustment signal is determined by a sum of the resistance of the adjustment resistor set and the equivalent resistance of the switch, whereby the power converter module decreases the output current; and when the input voltage provided by the photovoltaic power module at the input terminal is equal to or larger than the predetermined voltage threshold, the equivalent resistance of the switch is controlled to be near zero so that the level of the output adjustment signal is determined by the resistance of the adjustment resistor set, whereby the power converter module maintains the output current at a maximum.

In one embodiment, the input voltage sense circuit includes at least two resistors connected in series, for generating the input voltage related signal according to the input voltage.

In one embodiment, the input voltage sense circuit includes a Zener diode, for generating the input voltage related signal according to the input voltage.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes.

In one embodiment, the charger circuit with temperature compensation function according to the present invention is operable under constant current control mode (CC mode). In another embodiment, the charger circuit with temperature compensation function according to the present invention is operable under constant voltage control mode (CV mode).

Figure 1A:
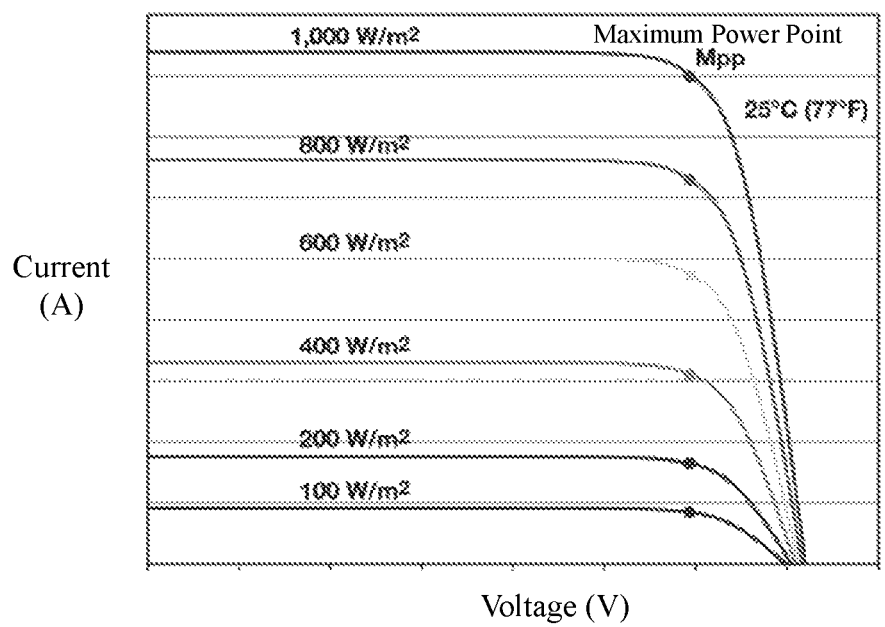
FIG. 1A is a diagram showing voltage-current characteristic curves of a prior art photovoltaic power module under the same temperature.
Figure 1B:
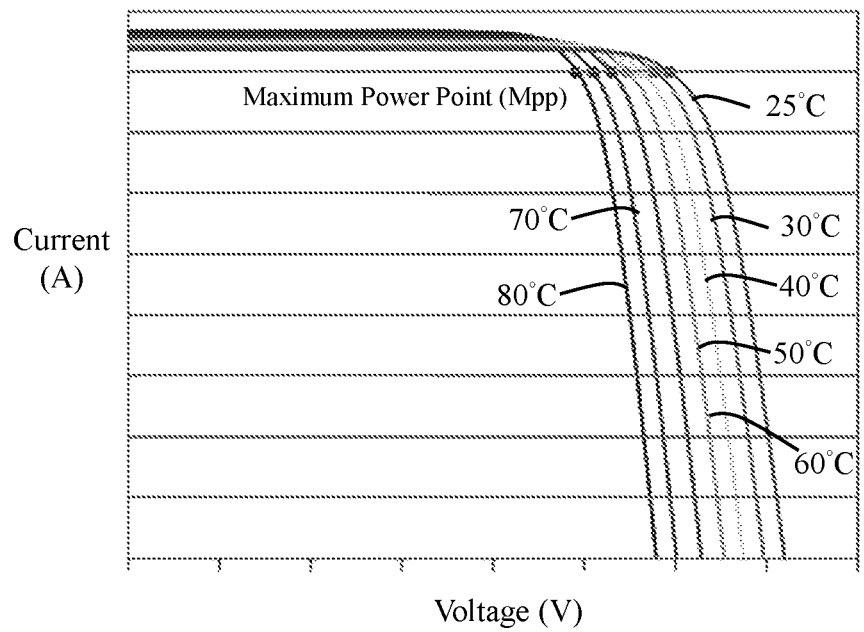
FIG. 1B is a diagram showing voltage-current characteristic curves of a prior art photovoltaic power module under the same sunlight brightness.
Figure 2:
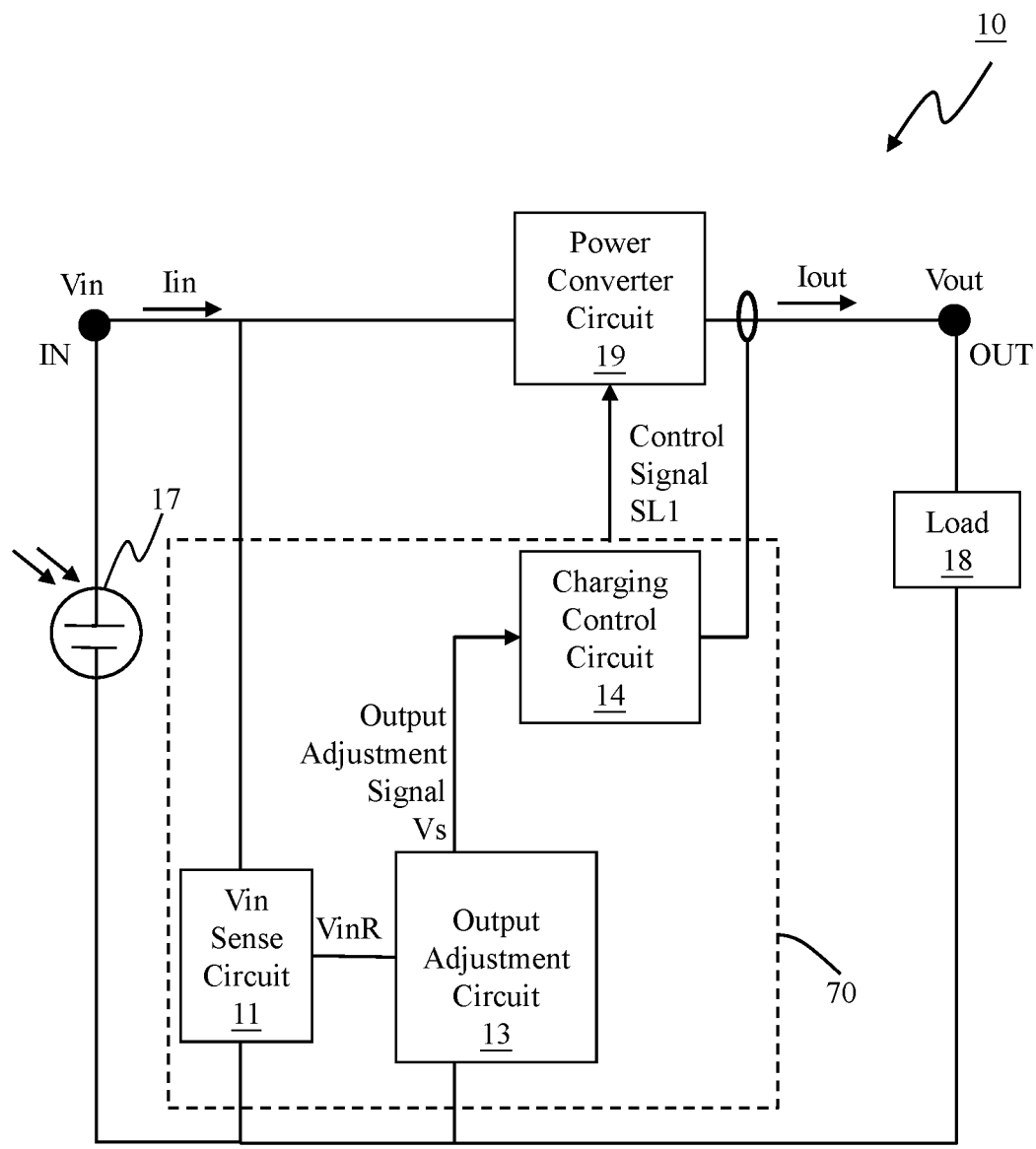
FIG. 2 shows a charger circuit with temperature compensation function according to an embodiment of the present invention, which operates under constant current control mode (CC mode).

Please refer to FIG. 2, which shows an embodiment of the charger circuit 10 with temperature compensation function which is operable under CC mode according to the present invention.

As shown in FIG. 2, the charger circuit 10 according to the present invention has an input terminal IN which is coupled to a photovoltaic power module 17, and an output terminal OUT which is coupled to a load 18. The charger circuit 10 is configured to convert an input voltage Vin at the input terminal IN to an output voltage Vout at the output terminal OUT in a charging mode. In the charging mode, the charger circuit 10 provides an output current Iout to the load 18 through the output terminal OUT.

In one embodiment, the load 18 is a battery. In other embodiments, the load 18 may be any apparatus or device that requires receiving electric power.

In this embodiment, the charger circuit 10 includes: a power converter circuit 19, an input voltage sense circuit 11, an output adjustment circuit 13, and a charging control circuit 14. As shown in FIG. 2, the input voltage sense circuit 11, the output adjustment circuit 13, and the charging control circuit 14 (or some components of these circuits) can be integrated into an integrated circuit (controller circuit 70).

As shown in FIG. 2, the power converter circuit 19 is coupled between the input terminal IN and the output terminal OUT of the charger circuit 10, for converting the input voltage Vin provided by the photovoltaic power module 17 at the input terminal IN to the output voltage Vout at the output terminal OUT. In the charging mode, the input current Iin is also converted by the power converter circuit 19 to the output current Iout which is supplied to the load 18 (a battery for example) through the output terminal OUT.

The power converter circuit 19 may be, for example but not limited to, a synchronous or non-synchronous buck, boost, inverting, buck-boost or boost-inverting converter circuit as shown in FIGS. 5A-5J. In another embodiment, the power converter circuit 19 may be, for example but not limited to, a low drop-out linear voltage regulator (LDO).

Figure 3A:
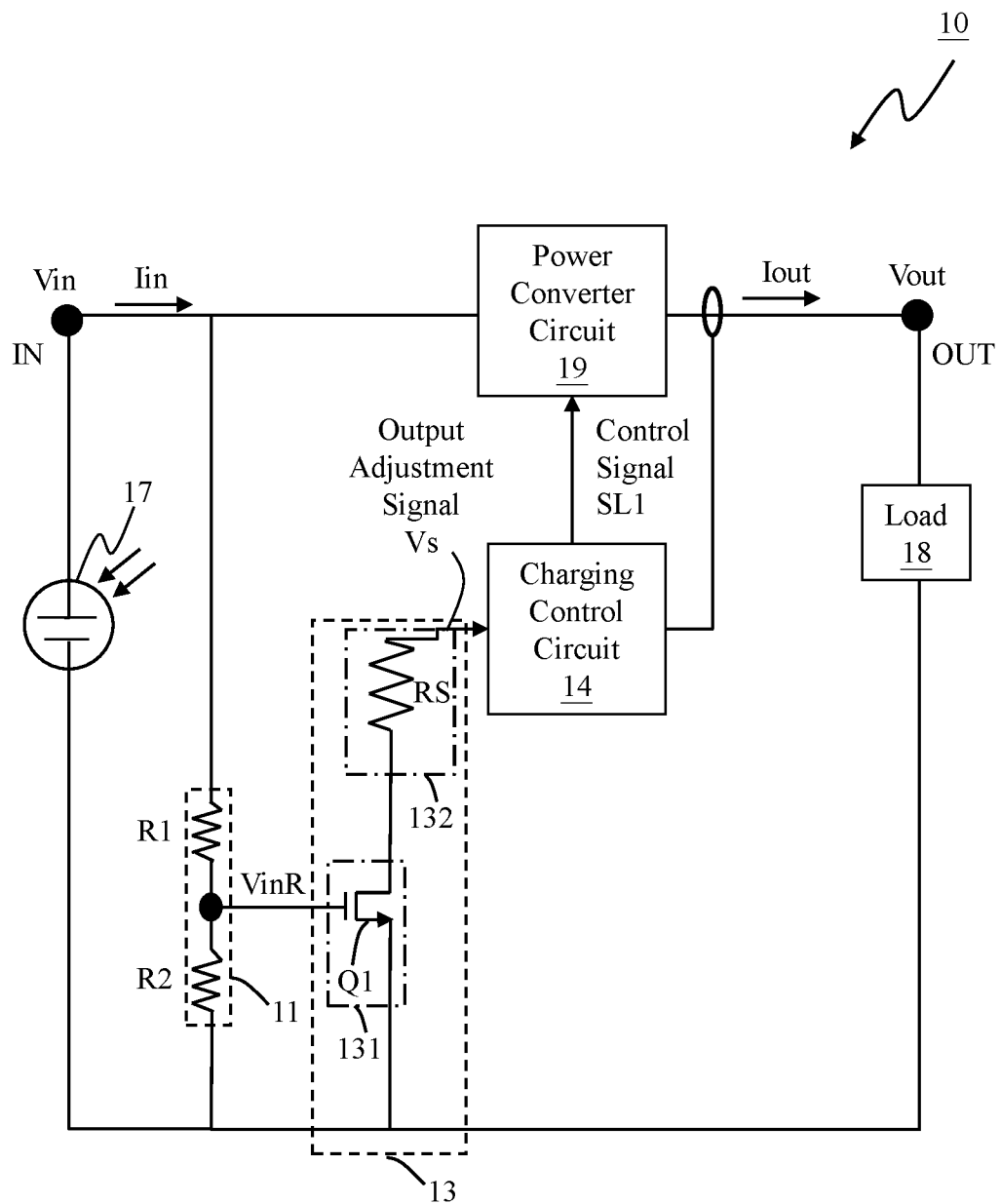
FIG. 3A shows an input voltage sense circuit and an output adjustment circuit according to an embodiment of the present invention, which operate under CC mode.
Figure 3B:
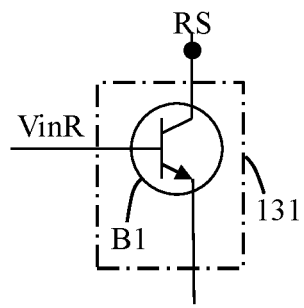
FIG. 3B shows a switch in an output adjustment circuit according to an embodiment of the present invention, which operates under CC mode.

Please refer to FIGS. 3A-3B in conjunction with FIG. 2. FIG. 3A shows an input voltage sense circuit and an output adjustment circuit according to an embodiment of the present invention, which operate under CC mode. FIG. 3B shows a switch in the output adjustment circuit according to an embodiment of the present invention, which operates under CC mode.

As shown in FIG. 2, the input voltage sense circuit 11 is coupled to the input terminal IN of the charger circuit 10, for generating an input voltage related signal VinR according to the input voltage Vin. In one embodiment, as shown in FIG. 3A, the input voltage sense circuit 11 includes a voltage divider circuit including resistors R1 and R2 connected in series, wherein one end of the resistor R1 is coupled to the input voltage Vin and one end of the resistor R2 is coupled to ground, and the input voltage related signal VinR is obtained from the voltage across the resistor R2 (or from a common node between the resistors R1 and R2).

Or, in another embodiment, if the output adjustment circuit 13 can withstand the voltage level of the input voltage Vin, then the input voltage sense circuit 11 may be omitted, and the output adjustment circuit 13 can receive the input voltage Vin directly.

As shown in FIG. 2, the output adjustment circuit 13 is coupled to the input voltage sense circuit 11, for generating an output adjustment signal Vs according to the input voltage related signal VinR according to the input voltage Vin. In one embodiment, as shown in FIG. 3A, the output adjustment circuit 13 includes: a switch 131 and an adjustment resistor set 132.

Figure 6A:
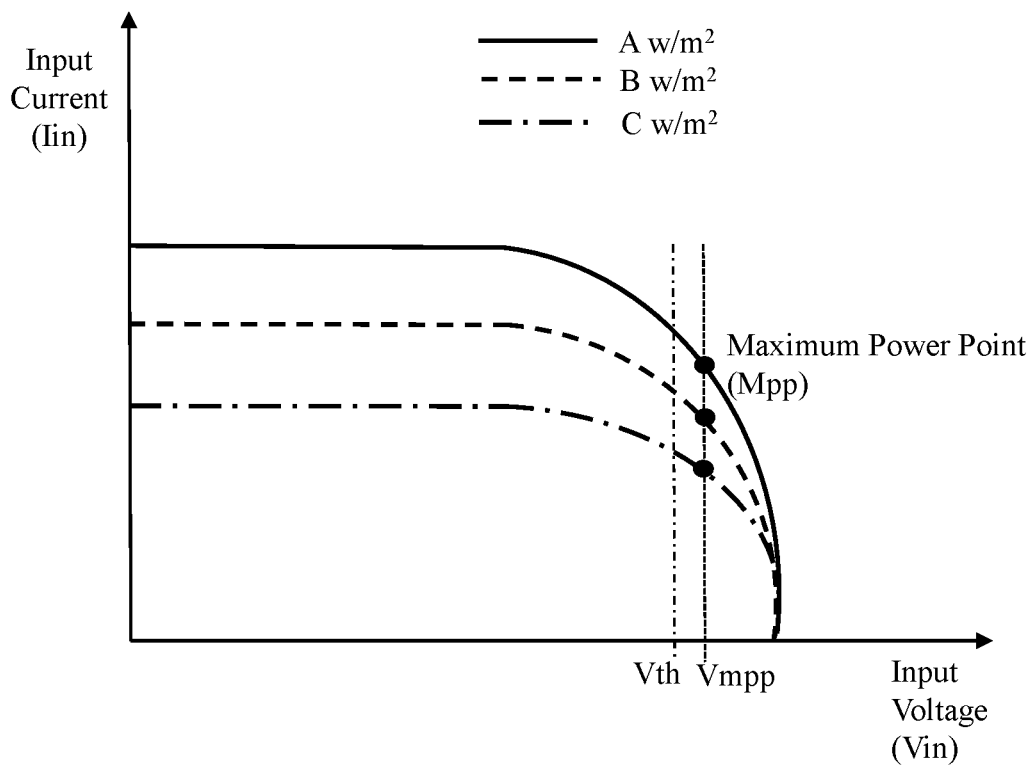
FIG. 6A is a diagram showing voltage-current characteristic curves of a charger circuit with temperature compensation function according to the present invention, under the same temperature.

The switch 131 operates (is turned ON or OFF) according to a relationship between the input voltage related signal VinR and a predetermined voltage threshold Vth (FIG. 6A). In one embodiment, as shown in FIG. 3A, the switch 131 for example may be an NMOS transistor switch Q1. In another embodiment, as shown in FIG. 3B, the switch 131 for example may be an NPN BJT switch B1. How the switch 131 operates (is turned ON or OFF) in CC mode according to the relationship between the input voltage related signal VinR and the predetermined voltage threshold Vth will be explained in detail later.

The present invention has a feature which is an advantage over the prior art in that: the switch 131 includes a PN junction similarly to that in the photovoltaic power module 17 (regardless whether the switch 131 is an NMOS transistor switch or an NPN BJT switch), so the switch 131 and the photovoltaic power module 17 have similar temperature coefficients. Thus, the switch 131 and the photovoltaic power module 17 present similar changes in their electrical characteristics at different temperatures; that is, the charger circuit 10 according to the present invention can automatically compensate the temperature effect of the photovoltaic power module 17.

The adjustment resistor set 132 is configured to determine the level of the output adjustment signal Vs by adjusting the resistance of the adjustment resistor set 132. In one embodiment, as shown in FIG. 3A, the adjustment resistor set 132 for example may be a resistor RS. How the adjustment resistor set 132 determines the level of the output adjustment signal Vs by adjusting the resistance of the adjustment resistor set 132 in CC mode will be explained in detail later.

The present invention has another feature which is an advantage over the prior art in that: in the prior art, to calculate the maximum power point Mpp, a microprocessor in cooperation with frequent voltage sense and current sense are required, which requires complicated calculation and complicated large-size components; in contrast, the present invention is much more efficient. On the one hand, when the input voltage Vin provided by the photovoltaic power module 17 at the input terminal IN is smaller than the predetermined voltage threshold Vth (FIG. 6A), which indicates that the power supply capability from the input terminal IN is insufficient, the power converter circuit 19 of the present invention will lower the output current Iout, to dynamically adjust the power supplied from the photovoltaic power module 17. Because the output current Iout is related to the input current Iin, when the power supply capability of the photovoltaic power module 17 is insufficient, by reducing the output current Iout supplied by the power converter circuit 19, the input current Iin is reduced, whereby the photovoltaic power module 17 can be controlled to operate at its maximum power point Mpp under different sunlight brightnesses.

On the other hand, when the input voltage Vin provided by the photovoltaic power module 17 at the input terminal IN is equal to or higher than the predetermined voltage threshold Vth, it indicates that the input terminal IN has sufficient power supply capability, and the output current Iout supplied by the power converter circuit 19 can be maintained at a maximum level, whereby the photovoltaic power module 17 can be controlled to provide power as high as possible to the load 18.

In one embodiment, the predetermined voltage threshold Vth for example can be correlated to a conduction threshold of the switch 131. Thus, the switch 131 can be turned ON or OFF according to the relationship between the input voltage related signal VinR and the predetermined voltage threshold Vth. In one embodiment, the temperature coefficient of the switch 131 is correlated to the temperature coefficient of the photovoltaic power module 17, and in one preferred embodiment, the temperature coefficient of the switch 131 is positively correlated to the temperature coefficient of the photovoltaic power module 17.

The following description explains how the charging control circuit 14 according to the present invention controls the power converter circuit 19 so that the power converter circuit 19 adaptively reduces the output current Iout or maintains the output current Iout at a maximum level.

Figure 4:
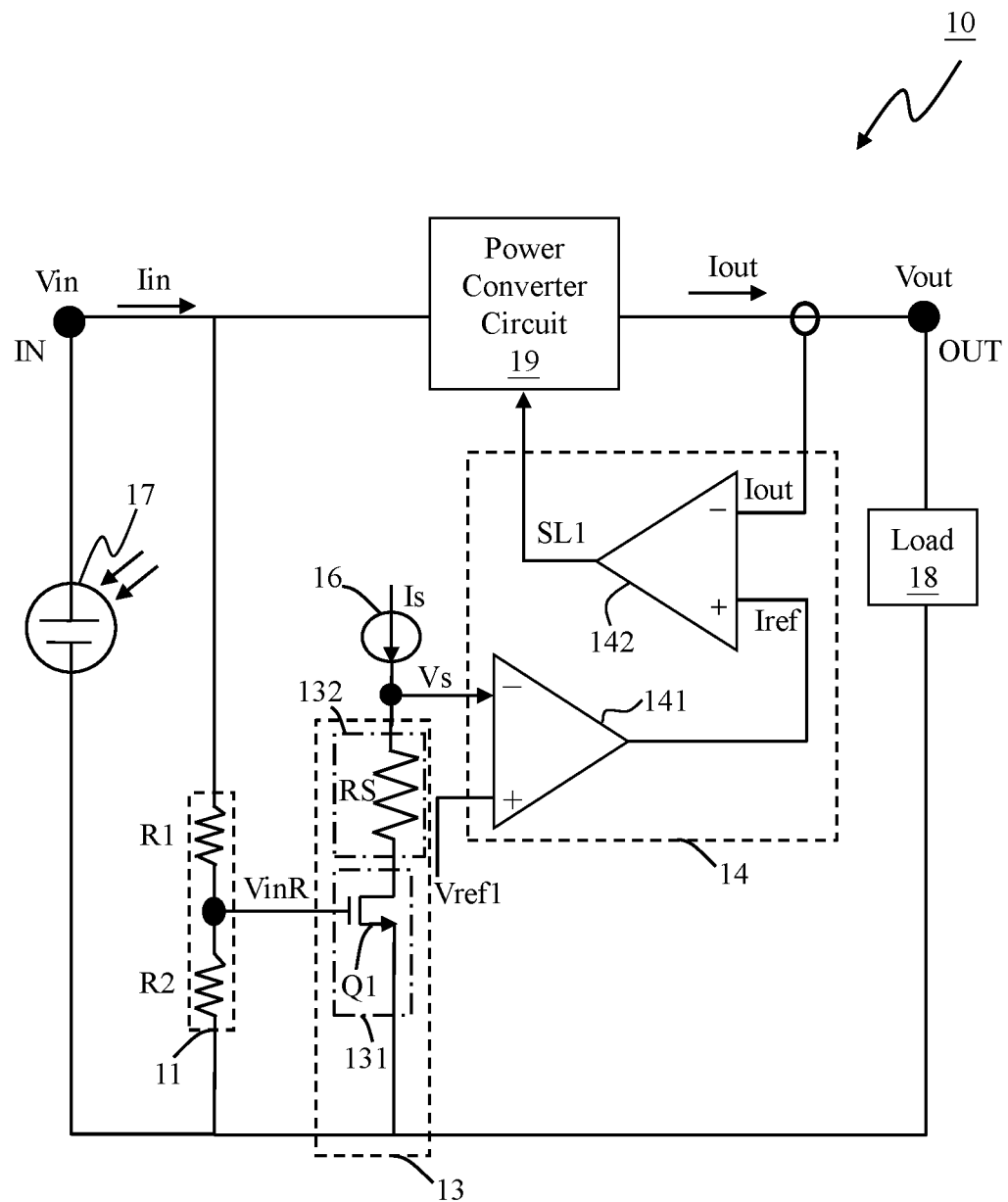
FIG. 4 shows a charging control circuit according to an embodiment of the present invention, which operates under CC mode.
Figure 5A:
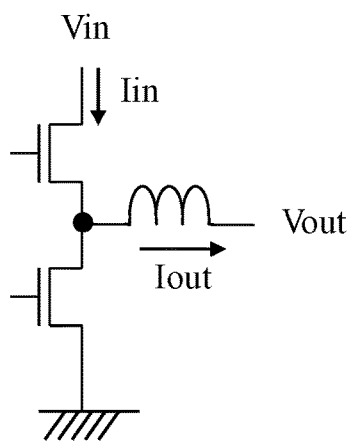
FIGS. 5A-5J show synchronous and non-synchronous buck, boost, inverting, buck-boost and boost-inverting converter circuits.
Figure 5B:
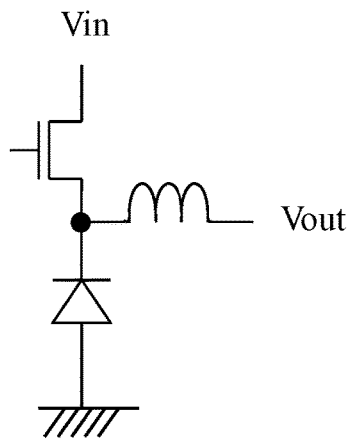
Figure 5C:
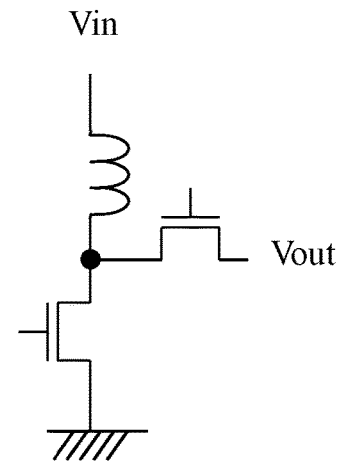
Figure 5D:
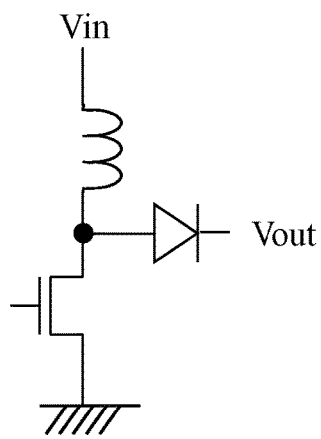
Figure 5E:
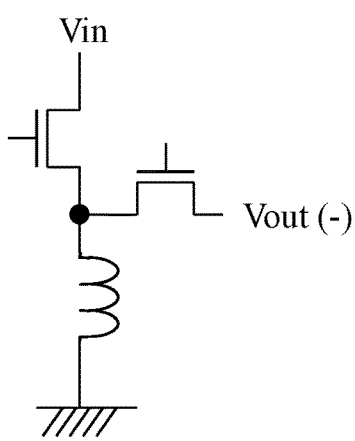
Figure 5F:
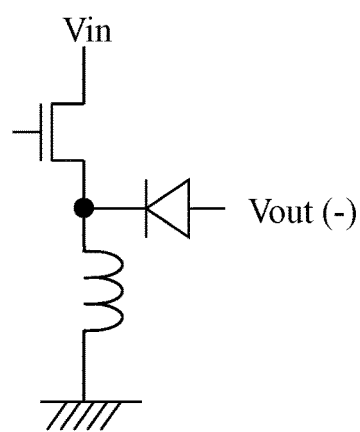
Figure 5G:
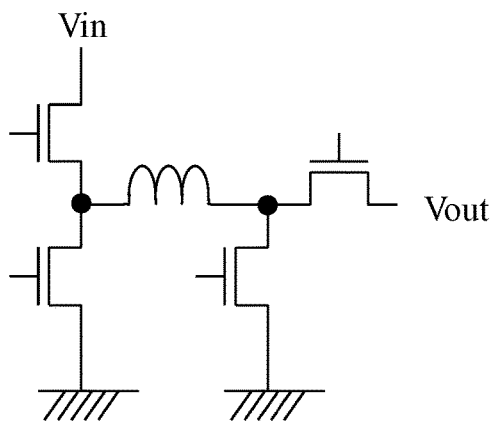
Figure 5H:
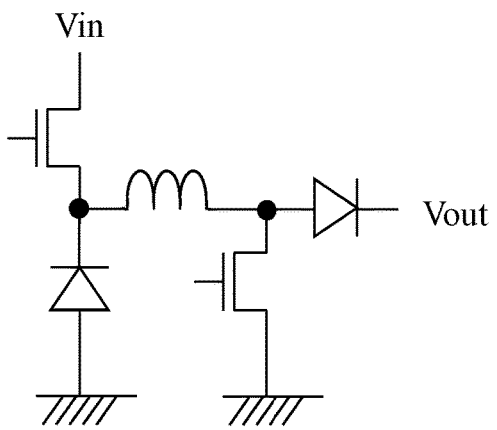
Figure 5I:
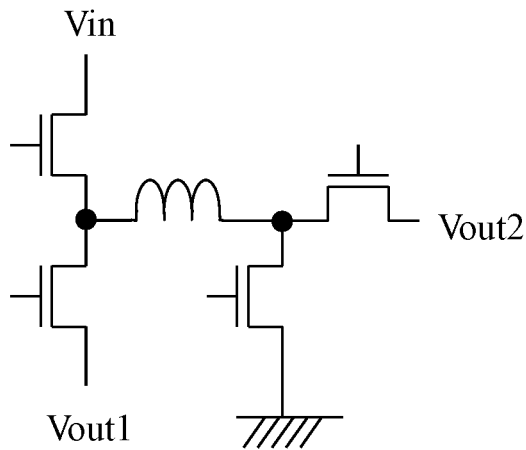
Figure 5J:
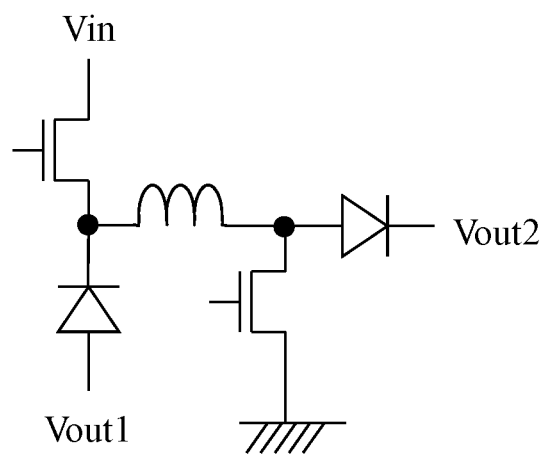

Please refer to FIG. 4 in conjunction with FIG. 2. FIG. 4 shows a charging control circuit according to an embodiment of the present invention, which operates under CC mode. As shown in FIG. 2, under CC mode, the charging control circuit 14 is coupled between the power converter circuit 19 and the output adjustment circuit 13; the charging control circuit 14 is configured to generate a control signal SL1 according to the output adjustment signal Vs and the level of the output current Iout, for adjusting the output current Iout supplied by the power converter circuit 19.

In one embodiment, as shown in FIG. 4, the charging control circuit 14 for example includes: a signal amplifier circuit 141 and an error amplifier circuit 142. One input of the signal amplifier circuit 141 is coupled to the output adjustment circuit 13; the signal amplifier circuit 141 amplifies the difference between the output adjustment signal Vs and a voltage reference Vref1, to output an output current reference Iref. One input of the error amplifier circuit 142 is coupled to the output of the signal amplifier circuit 141; under CC mode, another input of the error amplifier circuit 142 receives the output current Iout (or a signal relating to the output current Iout). The error amplifier circuit 142 amplifies the difference between the output current reference Iref and the output current Iout to generate the control signal SL1 for controlling the output current Iout supplied by the power converter circuit 19.

More specifically, when the input voltage Vin provided by the photovoltaic power module 17 at the input terminal IN is smaller than the predetermined voltage threshold Vth, an equivalent resistance Rq of the switch 131 increases (in this example, it is assumed that the switch 131 is an NMOS transistor Q1 as shown in FIG. 4), and the level of the output adjustment signal Vs is determined by the sum of the resistance of the adjustment resistor set 132 (in this example, it is assumed that the adjustment resistor set 132 is a resistor RS as shown in FIG. 4) and the equivalent resistance Rq of the switch 131, that is, the output adjustment signal Vs is equal to the current Is supplied by the current source 16 multiplied by the sum of (RS+Rq), which is:

$$Vs=Is*(RS+Rq) \quad \text{(Eq.1)}$$

Thus, in this example, the level of the output adjustment signal Vs increases.

And, because the output current reference Iref is equal to the difference between the voltage reference Vref1 and the output adjustment signal Vs multiplied by a ratio k, wherein the ratio k is the amplification ratio of the signal amplifier circuit 141, the following equation is obtained:

$$Iref=\{Vref1-Is*(RS+Rq)\}*k \quad \text{(Eq. 2)}$$

In brief, when the input voltage Vin provided by the photovoltaic power module 17 at the input terminal IN is smaller than the predetermined voltage threshold Vth, which indicates that the power supply capability from the input terminal IN is insufficient, the equivalent resistance Rq of the switch Q1 increases, whereby the level of the output adjustment signal Vs increases, and the output current reference Iref decreases.

In one embodiment, the output current reference Iref may represent a safety upper limit of the charging current to the load (i.e. the output current Iout), or a predetermined limit. The charging current to the load (i.e. the output current Iout) can be controlled not to exceed the limit.

In short, when the input voltage Vin provided by the photovoltaic power module 17 at the input terminal IN is smaller than the predetermined voltage threshold Vth, which indicates that the power supply capability from the input terminal IN is insufficient, the output current reference Iref decreases so that the power converter circuit 19 decreases the output current Iout it supplies.

On the other hand, when the input voltage Vin provided by the photovoltaic power module 17 at the input terminal IN is equal to or larger than the predetermined voltage threshold Vth, the switch 131 (in this example, it is assumed that the switch 131 is an NMOS transistor Q1 as shown in FIG. 4) is ON, such that the equivalent resistance Rq of the switch Q1 is near zero (Rq 0), and in this case the level of the output adjustment signal Vs is determined by the resistance of the adjustment resistor set 132 (in this example, it is assumed that the adjustment resistor set 132 is a resistor RS as shown in FIG. 4), that is, the output adjustment signal Vs is equal to the current Is supplied by the current source 16 multiplied by resistance RS, which is:

$$Vs=Is*RS \quad \text{(Eq. 3)}$$

Note that a certain amount of error is tolerable, so the equivalent resistance Rq of the switch Q1 is only required to be near zero but not required to be exactly zero.

In comparison with the output adjustment signal Vs in Eq. 1, the output adjustment signal Vs in Eq. 3 is smaller. And, because the output current reference Iref is equal to the difference between the voltage reference Vref1 and the output adjustment signal Vs multiplied by a ratio k, the following equation is obtained:

$$Iref=\{Vref1-Is*RS\}*k \qquad (Eq. 4)$$

In brief, when the input voltage Vin provided by the photovoltaic power module 17 at the input terminal IN is equal to or larger than the predetermined voltage threshold Vth, which indicates that the power supply capability from the input terminal IN is sufficient, the equivalent resistance Rq of the switch Q1 is near zero (Rq≈0), whereby the level of the output adjustment signal Vs is lowered, and the output current reference Iref increases (in comparison with the output current reference Iref in Eq. 2, the output current reference Iref in Eq. 4 is larger.).

In one embodiment, the output current reference Iref may represent a safety upper limit of the charging current to the load (i.e. the output current Iout), or a predetermined maximum. The charging current to the load (i.e. the output current Iout) can be controlled not to exceed the maximum. In this example, the power converter circuit 19 charges the load 18 by this predetermined maximum.

Thus, when the input voltage Vin provided by the photovoltaic power module 17 at the input terminal IN is equal to or larger than the predetermined voltage threshold Vth, which indicates that the power supply capability from the input terminal IN is sufficient, the output current reference Iref increases so that the power converter circuit 19 maintains the output current Iout at a maximum.

Figure 6B:
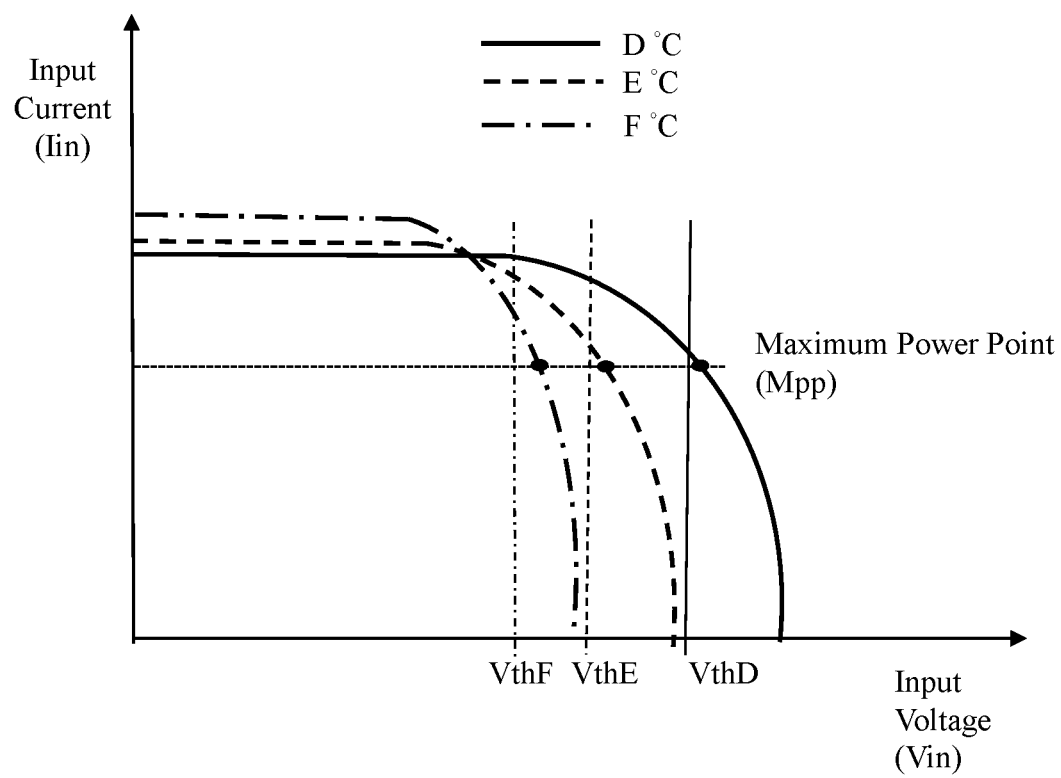
FIG. 6B is a diagram showing voltage-current characteristic curves of a charger circuit with temperature compensation function according to the present invention, under the same sunlight brightness.

Please refer to FIGS. 6A-6B in conjunction with FIG. 4. FIG. 6A is a diagram showing voltage-current characteristic curves of a charger circuit with temperature compensation function according to the present invention, under the same temperature. FIG. 6B is a diagram showing voltage-current characteristic curves of a charger circuit with temperature compensation function according to the present invention, under the same sunlight brightness.

FIG. 6A shows the voltage-current characteristic curves of the charger circuit 10 according to the present invention, at the same temperature such as 25° C., under three different sunlight brightnesses of A W/m², B W/m², and C W/m², wherein A>B>C. As shown in the figure, the input voltage Vin corresponding to the Mpp does not change too much, but the input current Iin corresponding to the Mpp changes drastically. This indicates that the input current Iin of the charger circuit 10 is correlated to the received brightness, with a linear correlation in between.

The present invention has a feature which is an advantage over the prior art in that: as shown in FIG. 6A, regardless whether the power supply capability of the input terminal IN is sufficient or insufficient, the switch 131 can operate (is turned ON or OFF) according to the relationship between the input voltage related signal VinR and the predetermined voltage threshold Vth. In particular, in one embodiment, the predetermined voltage threshold Vth can be set to be correlated to a conduction threshold of the switch 131; thus, the switch 131 is turned ON or OFF according to the relationship between the input voltage related signal VinR and the predetermined voltage threshold Vth. As such, the charging control circuit 14 controls the power converter circuit 19 according to the relationship between the input voltage related signal VinR and the predetermined voltage threshold Vth, such that the power converter circuit 19 can adaptively decrease the output current Iout or maintain the output current Iout at a maximum.

FIG. 6B shows the voltage-current characteristic curves of the charger circuit 10 according to the present invention, at the same sunlight brightness such as 1000 W/m², under different temperatures. As shown in FIG. 6B, the temperatures are respectively D ° C., E ° C., and F ° C., wherein F ° C.>E ° C.>D ° C., and each voltage-current characteristic curve has a corresponding predetermined voltage threshold, i.e., VthD, VthE, or VthF. FIG. 6B shows that when the temperature increases, the input voltage Vin of the charger circuit 10 according to the present invention decreases, while the input current Iin of the charger circuit 10 increases. That is, at the same sunlight brightness but under different temperatures, the input voltage yin of the charger circuit 10 presents a negative temperature coefficient while the input current Iin of the charger circuit 10 presents a positive temperature coefficient.

The sunlight radiation and power loss of the PN junction will cause the temperature of the charger circuit 10 to increase, and it can be significantly higher than the environment; hence, the temperature effect is an important factor to be taken into consideration. The present invention addresses this issue in two aspects. First, the present invention uses the charging control circuit 14 to control the power converter circuit 19 according to a relationship between the input voltage related signal VinR and the predetermined voltage threshold (VthD, VthE or VthF in FIG. 6B), such that the power converter circuit 19 can adaptively reduce the output current Iout or maintain the output current Iout at a maximum level. Second, the switch 131 of the output adjustment circuit 13 is a device having a PN junction, such as a MOS transistor or a BJT. Both types of transistors, because they have a PN junction, correlate its temperature coefficient with the temperature coefficient of the photovoltaic power module 17, to compensate the temperature effect.

Figure 7A:
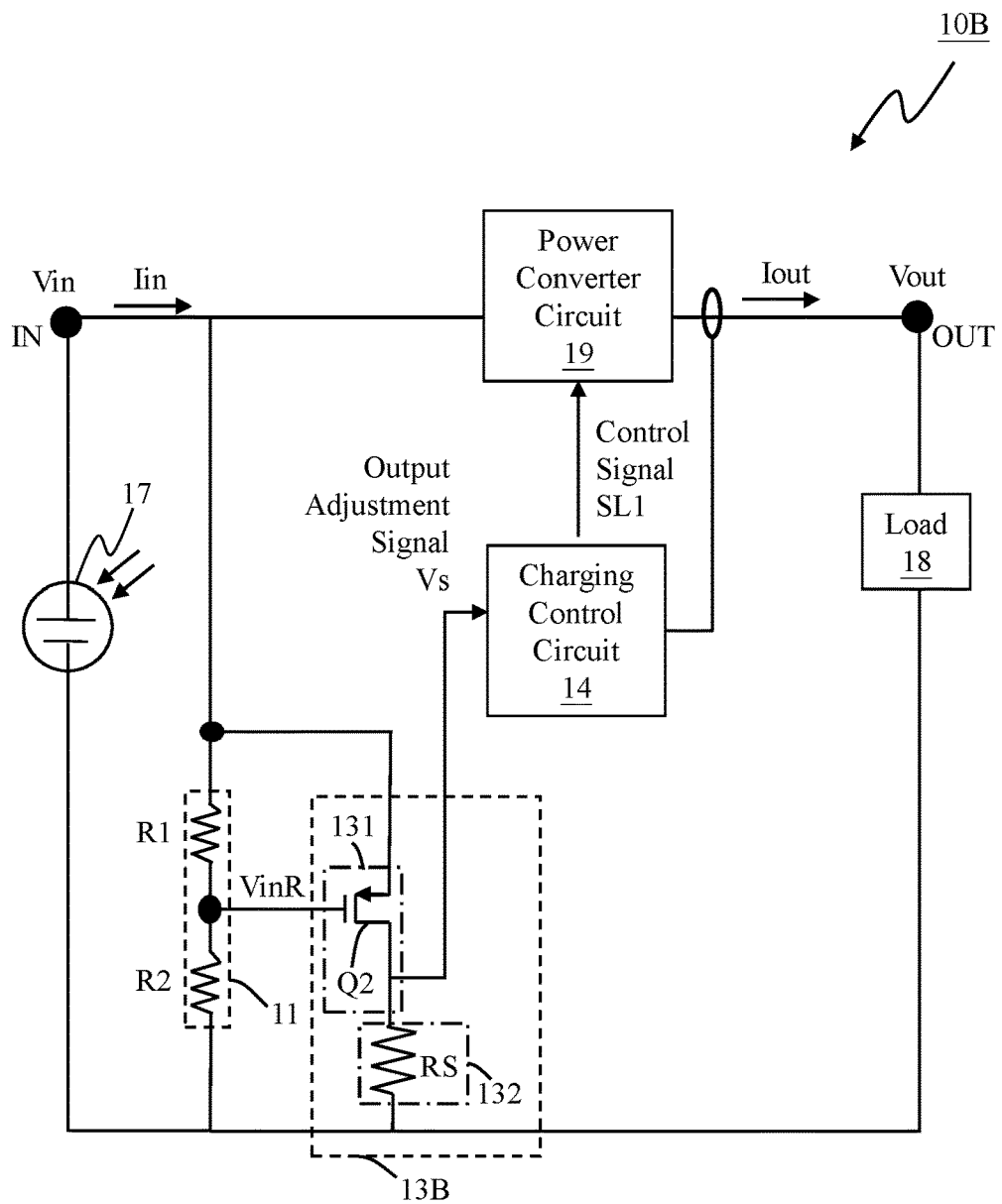
FIG. 7A shows a switch in an output adjustment circuit according to another embodiment of the present invention, which operates under CC mode.
Figure 7B:
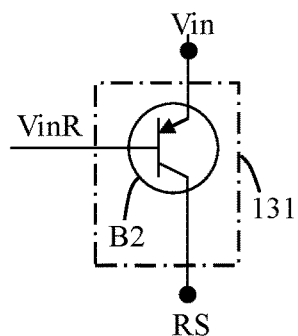
FIG. 7B shows a switch in an output adjustment circuit according to yet another embodiment of the present invention, which operates under CC mode.

Please refer to FIGS. 7A-7B. FIG. 7A shows a switch in an output adjustment circuit according to another embodiment of the present invention, which operates under CC mode. FIG. 7B shows a switch in an output adjustment circuit according to yet another embodiment of the present invention, which operates under CC mode.

Under CC mode, in one embodiment as shown in FIG. 7A, the switch 131 of the output adjustment circuit 13B of the charger circuit 10B according to the present invention for example can be a PMOS transistor switch Q2. In another embodiment as shown in FIG. 7B, the switch 131 of the output adjustment circuit 13B of the charger circuit 10B according to the present invention for example can be a PNP BJT switch B2.

The switch 131, being a PMOS transistor switch Q2 or a PNP BJT switch B2, operates according to a relationship between the input voltage related signal VinR and the predetermined voltage threshold Vth in a similar way to the switch 131 being an NMOS transistor switch Q1 or a NPN BJT switch B1.

However, there is a difference that: when the input voltage Vin provided by the photovoltaic power module 17 at the input terminal IN is smaller than the predetermined voltage threshold Vth, if the switch 131 is the NMOS transistor switch Q1, the equivalent resistance Rq of the switch 131 increases; while, if the switch 131 is the PMOS transistor switch Q2, the equivalent resistance Rq of the switch 131 is near zero. When the input voltage Vin provided by the photovoltaic power module 17 at the input terminal IN is equal to or higher than the predetermined voltage threshold Vth, if the switch 131 is the NMOS transistor switch Q1, the equivalent resistance Rq of the switch 131 is near zero; while, if the switch 131 is the PMOS transistor switch Q2, the equivalent resistance Rq of the switch 131 increases.

Figure 8:
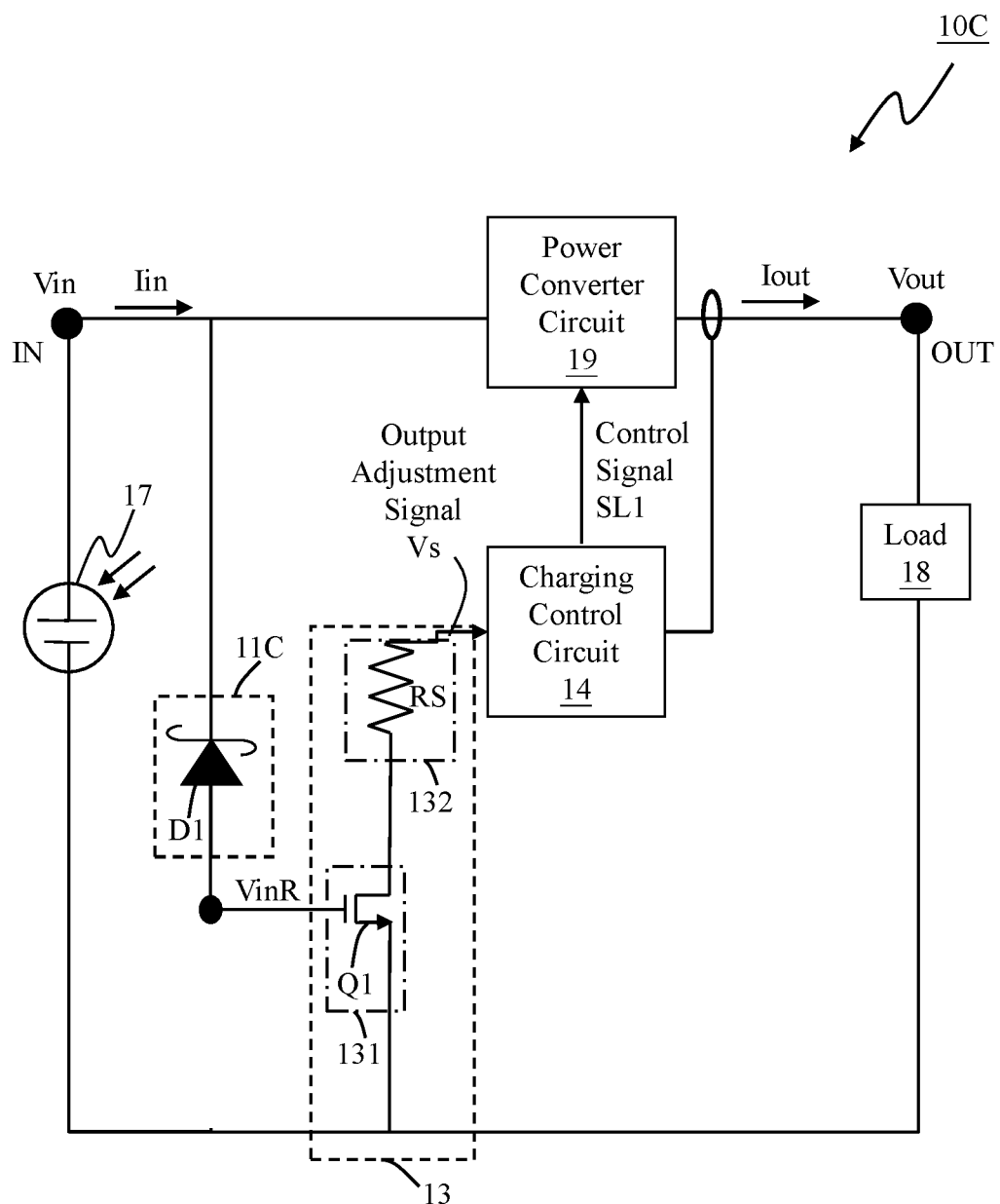
FIG. 8 shows an input voltage sense circuit according to another embodiment of the present invention, which operate under CC mode.

Please refer to FIG. 8. FIG. 8 shows an input voltage sense circuit according to another embodiment of the present invention, which operate under CC mode. This embodiment shows that the input voltage sense circuit 11 does not necessarily have to be a voltage divider circuit as shown in FIG. 3A. In another embodiment as shown, the input voltage sense circuit 11C of the charger circuit 10C for example can be a Zener diode D1, for generating the input voltage related signal VinR according to the input voltage Vin.

The following description explains how the charger circuit with temperature compensation function according to the present invention operates in the CV mode.

Figure 9:
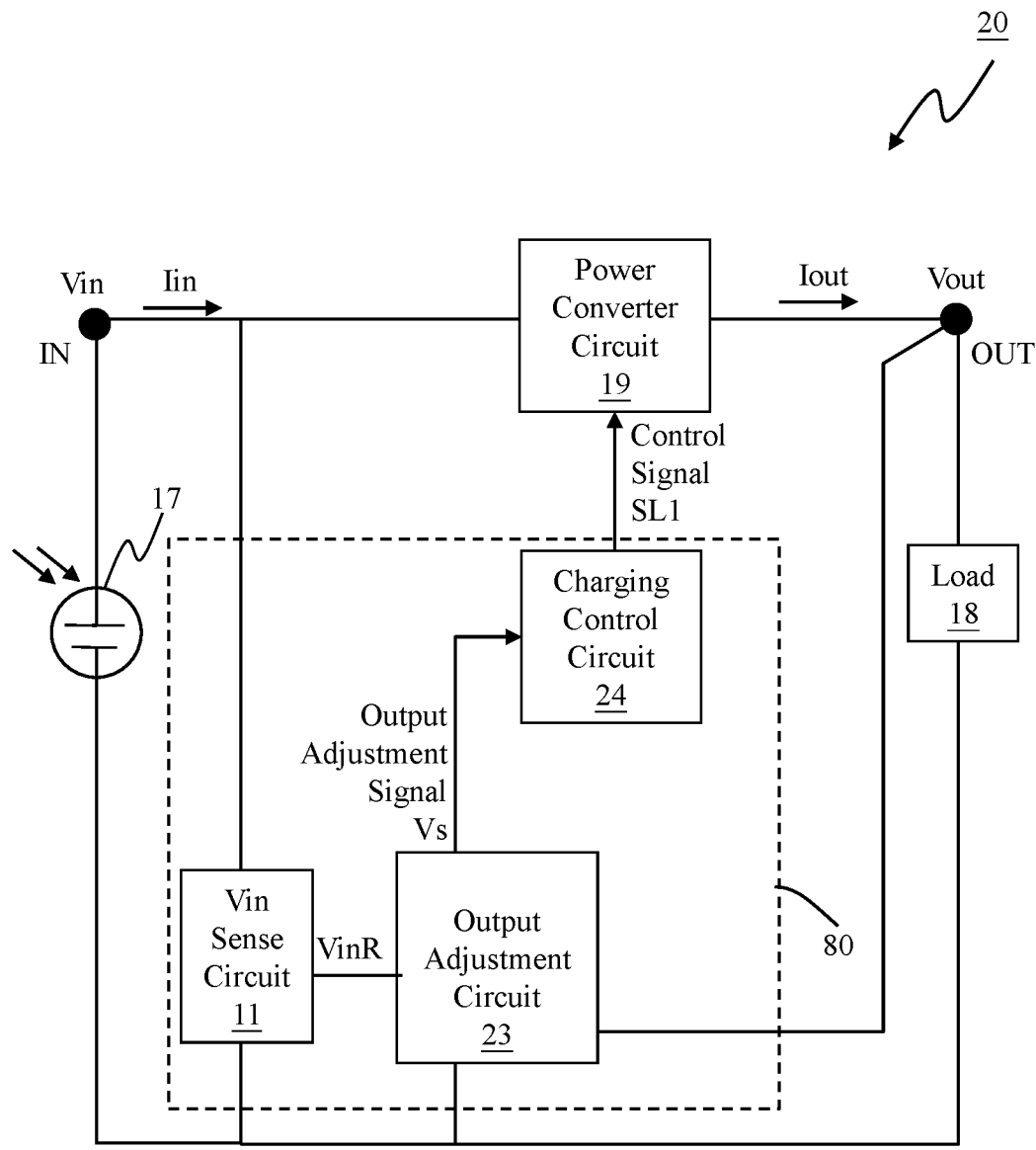
FIG. 9 shows a charger circuit with temperature compensation function according to an embodiment of the present invention, which operates under constant voltage control mode (CV mode).

Please refer to FIG. 9. FIG. 9 shows a charger circuit 20 with temperature compensation function according to an embodiment of the present invention, which operates under constant voltage control mode (CV mode).

In this embodiment, the charger circuit 20 includes: a power converter circuit 19, an input voltage sense circuit 11, an output adjustment circuit 23, and a charging control circuit 24. The power converter circuit 19, and the input voltage sense circuit 11 are similar to those in the previous embodiment and will not be redundantly explained here. As shown in FIG. 9, the input voltage sense circuit 11, the output adjustment circuit 23, and the charging control circuit 24 (or some components of these circuits) can be integrated into an integrated circuit (controller circuit 80).

The output adjustment circuit 23 and the charging control circuit 24 of the charger circuit 20 in this embodiment are different from those in the charger circuit 10 of the previous embodiment in that:

First, the output adjustment circuit 23 in this embodiment is connected to the output terminal OUT, to generate the output adjustment signal Vs according to the input voltage related signal VinR and the output voltage Vout. However, the output adjustment circuit 13 in the previous embodiment is not directly connected to the output terminal OUT.

Second, the charging control circuit 24 in this embodiment does not receive the output current Iout. As shown in FIG. 9, under CV mode, the charging control circuit 24 is coupled between the power converter circuit 19 and the output adjustment circuit 23, and the charging control circuit 24 generates the control signal SL1 solely according to the output adjustment signal Vs, to adjust the output current Iout supplied by the power converter circuit 19.

Figure 10A:
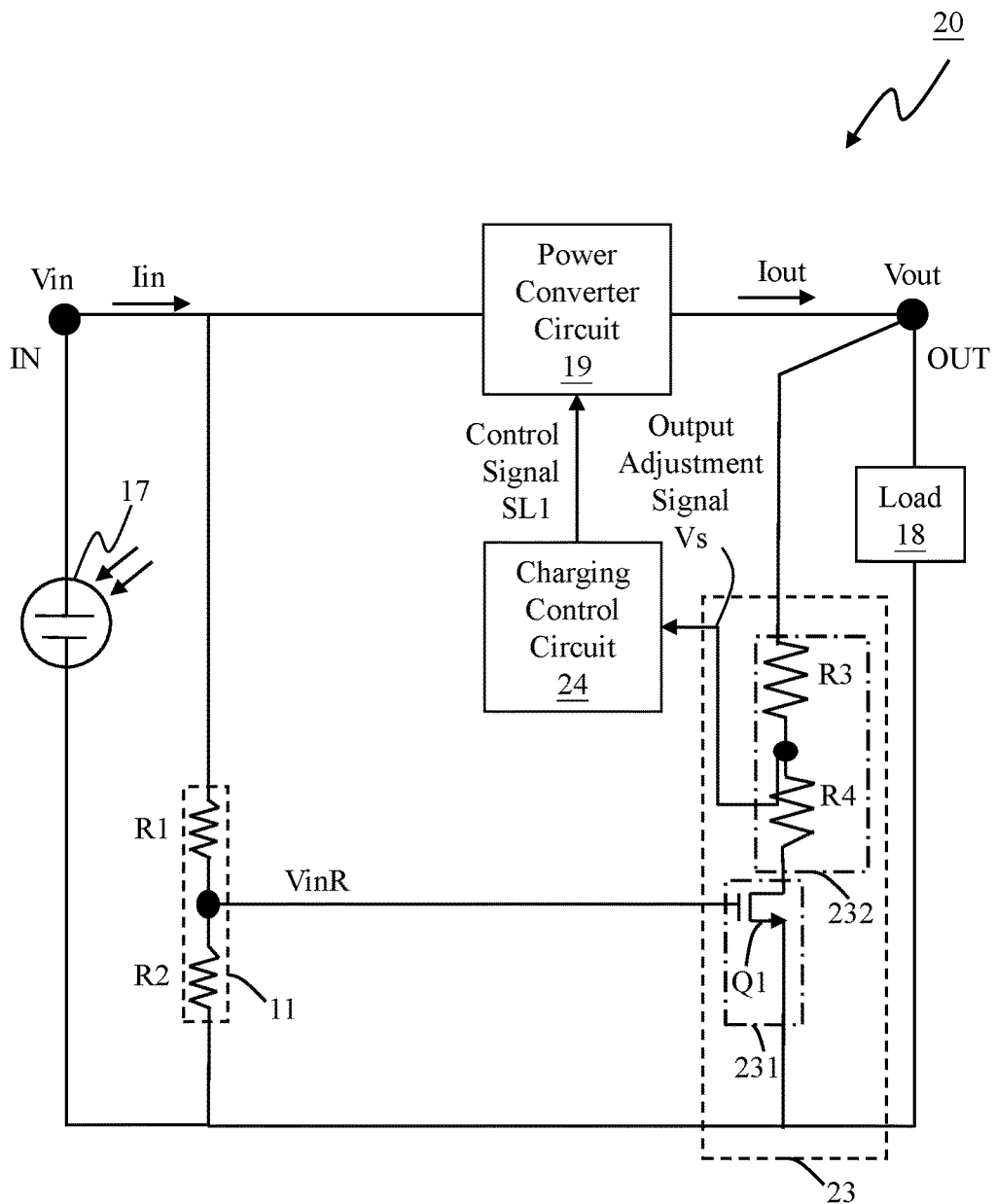
FIG. 10A shows an input voltage sense circuit and an output adjustment circuit according to an embodiment of the present invention, which operate under CV mode.
Figure 10B:
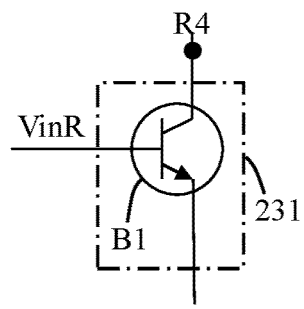
FIG. 10B shows a switch in an output adjustment circuit according to an embodiment of the present invention, which operates under CV mode.

Please refer to FIGS. 10A-10B in conjunction with FIG. 9. FIG. 10A shows an input voltage sense circuit and an output adjustment circuit according to an embodiment of the present invention, which operate under CV mode. FIG. 10B shows a switch in an output adjustment circuit according to an embodiment of the present invention, which operates under CV mode.

The input voltage sense circuit 11 of the charger circuit 20 in this embodiment is similar to input voltage sense circuit 11 of the charger circuit 10 in the previous embodiment; for example, the input voltage sense circuit 11 may include a voltage divider circuit including two resistors R1 and R2 connected in series.

As shown in FIG. 9, the output adjustment circuit 23 is coupled to the input voltage sense circuit 11, for generating an output adjustment signal Vs according to the input voltage related signal VinR according to the input voltage Vin. In one embodiment, as shown in FIG. 10A, the output adjustment circuit 23 includes: a switch 231 and an adjustment resistor set 232. The switch 231 included in the output adjustment circuit 23 has similar structure and features and operates similarly as the switch 131 included in the output adjustment circuit 13.

The switch 231 operates (is turned ON or OFF) according to a relationship between the input voltage related signal VinR and a predetermined voltage threshold Vth (FIG. 6A). In one embodiment, as shown in FIG. 10A, the switch 231 for example may be an NMOS transistor switch Q1. In another embodiment, as shown in FIG. 10B, the switch 231 for example may be an NPN BJT switch B1. How the switch 231 operates (is turned ON or OFF) under CV mode according to the relationship between the input voltage related signal VinR and the predetermined voltage threshold Vth will be explained in detail later.

The adjustment resistor set 232 is configured to determine the level of the output adjustment signal Vs by adjusting the resistance of the adjustment resistor set 232. In one embodiment, as shown in FIG. 10A, the adjustment resistor set 232 for example may be a voltage divider circuit, including two resistors R3 and R4 connected in series. One end of the resistor R3 is coupled to the output terminal OUT, and one end of the resistor R4 is coupled to the switch 231. The output adjustment signal Vs is obtained a common node between the resistors R3 and R4. It is a feature of the charger circuit 20 of the present invention that the output adjustment signal Vs is a signal that relates to the output voltage Vout. How the adjustment resistor set 232 determines the level of the output adjustment signal Vs by adjusting the resistance of the adjustment resistor set 232 in CV mode will be explained in detail later.

Figure 11:
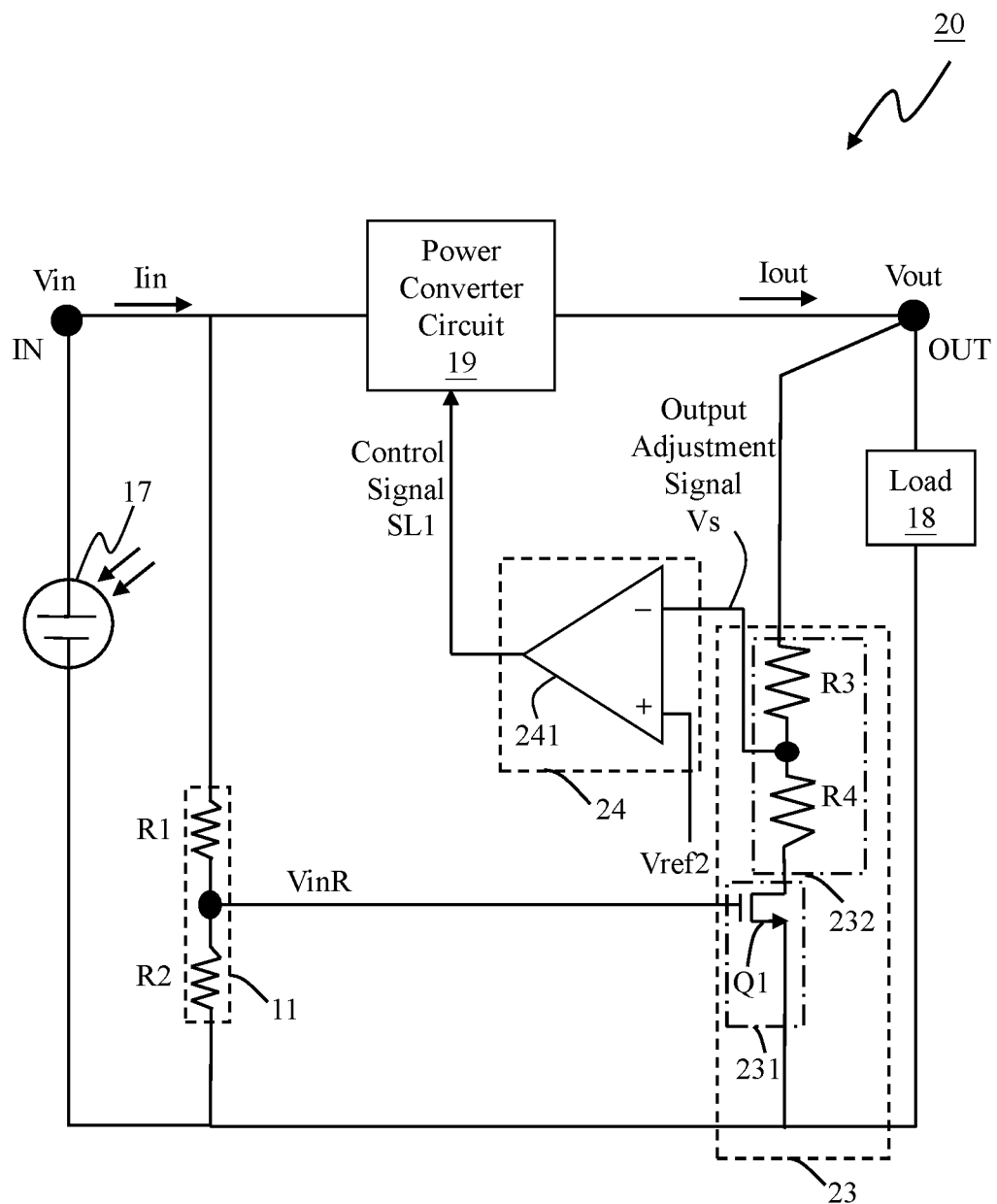
FIG. 11 shows a charging control circuit according to an embodiment of the present invention, which operates under CV mode.

Please refer to FIG. 11 in conjunction with FIGS. 9 and 10A-10B. FIG. 11 shows a charging control circuit according to an embodiment of the present invention, which operates under CV mode.

In one embodiment, as shown in FIG. 11, the charging control circuit 24 for example includes a signal amplifier circuit 241. One input of the signal amplifier circuit 241 is coupled to the output adjustment circuit 23. The signal amplifier circuit 241 amplifies the difference between the output adjustment signal Vs (which is a signal related to the output voltage Vout, or, an output voltage related signal) and a voltage reference Vref2, to generate the control signal SL1 for controlling the output current Iout supplied by the power converter circuit 19.

Referring to FIG. 9, under CV mode, the charging control circuit 24 is coupled between the power converter circuit 19 and the output adjustment circuit 23; the charging control circuit 24 is configured to generate a control signal SL1 according to the output adjustment signal Vs (output voltage related signal), for adjusting the output current Iout supplied by the power converter circuit 19.

More specifically, when the input voltage Vin provided by the photovoltaic power module 17 at the input terminal IN is smaller than the predetermined voltage threshold Vth, which indicates that the power supply capability from the input terminal IN is insufficient, an equivalent resistance Rq of the switch 231 increases (in this example, it is assumed that the switch 231 is an NMOS transistor Q1 as shown in FIG. 11), and the level of the output adjustment signal Vs is determined by the sum of the resistance of the adjustment resistor set 232 (in this example, it is assumed that the adjustment resistor set 232 is a voltage divider circuit including resistors R3 and R4 as shown in FIG. 11) and the equivalent resistance Rq of the switch 231. In this example, the increase of the equivalent resistance Rq of the switch 231 increases the feedback ratio (that is, increases the ratio of the output adjustment signal Vs to the output voltage Vout), the power converter circuit 19 will decrease the output current Iout. In one embodiment, the power converter circuit 19 also decreases the output voltage Vout accordingly.

On the other hand, when the input voltage Vin provided by the photovoltaic power module 17 at the input terminal IN is equal to or larger than the predetermined voltage threshold Vth, the switch 231 (in this example, it is assumed that the switch 231 is an NMOS transistor Q1 as shown in FIG. 11) is ON, such that the equivalent resistance Rq of the switch Q1 is near zero (Rq 0), such that the control signal SL1 is solely determined by the resistance of the adjustment resistor set 232 (in this example, it is assumed that the adjustment resistor set 232 is a resistor RS as shown in FIG. 11). Because the equivalent resistance Rq of the switch Q1 is near zero, the feedback ratio is reduced and is determined by the resistances of the resistors R3 and R4. Thus, the output current Iout supplied by the power converter circuit 19 maintained at a predetermined maximum. In another aspect, the output current Iout supplied by the power converter circuit 19 maintained at a predetermined value, which is determined by the resistances of the resistors R3 and R4 and the voltage reference Vref2.

Note that, to control the output adjustment signal Vs by controlling the operation of the switch (such as Q1) so as to adjust the output current, is not limited to controlling the equivalent resistance Rq of the switch to be near zero (or OFF in a different embodiment). Under the spirit of the present invention, in another embodiment, it can be thus arranged that the switch operates according to the input voltage related signal VinR to have different conduction levels (such as operating in its linear region), whereby the output adjustment signal Vs and the output current Iout may have various levels.

The charger circuit 20 operating in CV mode according to the present invention, in particular the embodiment described with reference to FIGS. 6A-6B, has features and merits which are similar to the charger circuit 10 operating in CC mode according to the present invention.

Figure 12A:
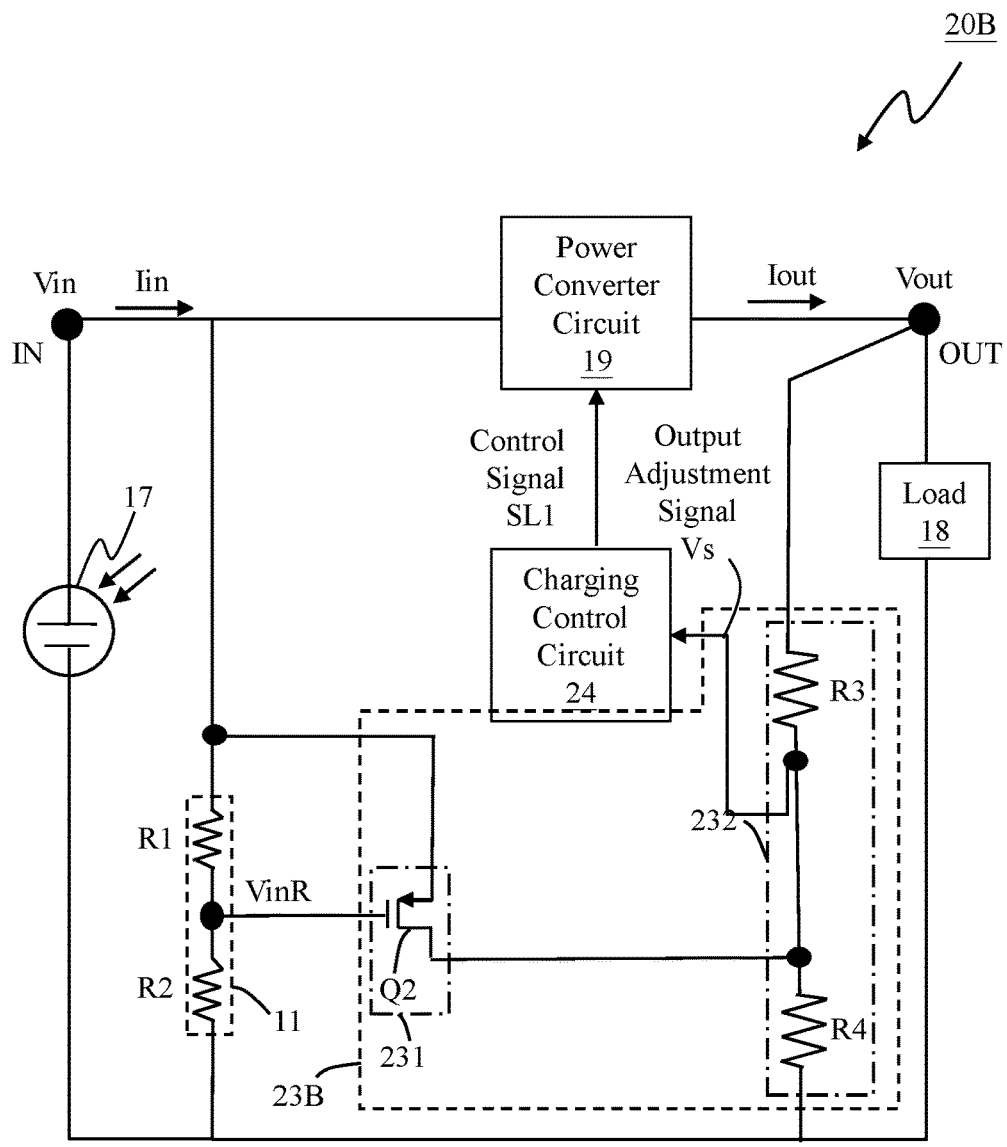
FIG. 12A shows a switch in an output adjustment circuit according to another embodiment of the present invention, which operates under CV mode.
Figure 12B:
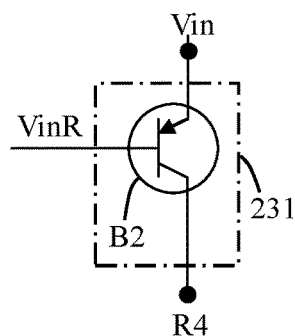
FIG. 12B shows a switch in an output adjustment circuit according to yet another embodiment of the present invention, which operates under CV mode.

Please refer to FIGS. 12A-12B. FIG. 12A shows a switch in an output adjustment circuit according to another embodiment of the present invention, which operates under CV mode. FIG. 12B shows a switch in an output adjustment circuit according to yet another embodiment of the present invention, which operates under CV mode.

Under CV mode, in one embodiment as shown in FIG. 12A, the switch 231 of the output adjustment circuit 23B of the charger circuit 20B according to the present invention for example can be a PMOS transistor switch Q2. In another embodiment as shown in FIG. 12B, the switch 231 of the output adjustment circuit 23B of the charger circuit 20B according to the present invention for example can be a PNP BJT switch B2.

The switch 231, being a PMOS transistor switch Q2 or a PNP BJT switch B2, operates according to a relationship between the input voltage related signal VinR and the predetermined voltage threshold Vth in a similar way to the switch 231 being an NMOS transistor switch Q1 or a NPN BJT switch B1.

However, there is a difference that: when the input voltage Vin provided by the photovoltaic power module 17 at the input terminal IN is smaller than the predetermined voltage threshold Vth, if the switch 231 is the NMOS transistor switch Q1, the equivalent resistance Rq of the switch 231 increases; while, if the switch 231 is the PMOS transistor switch Q2, the equivalent resistance Rq of the switch 231 is near zero. When the input voltage Vin provided by the photovoltaic power module 17 at the input terminal IN is equal to or higher than the predetermined voltage threshold Vth, if the switch 231 is the NMOS transistor switch Q1, the equivalent resistance Rq of the switch 231 is near zero; while, if the switch 231 is the PMOS transistor switch Q2, the equivalent resistance Rq of the switch 231 increases.

Figure 13:
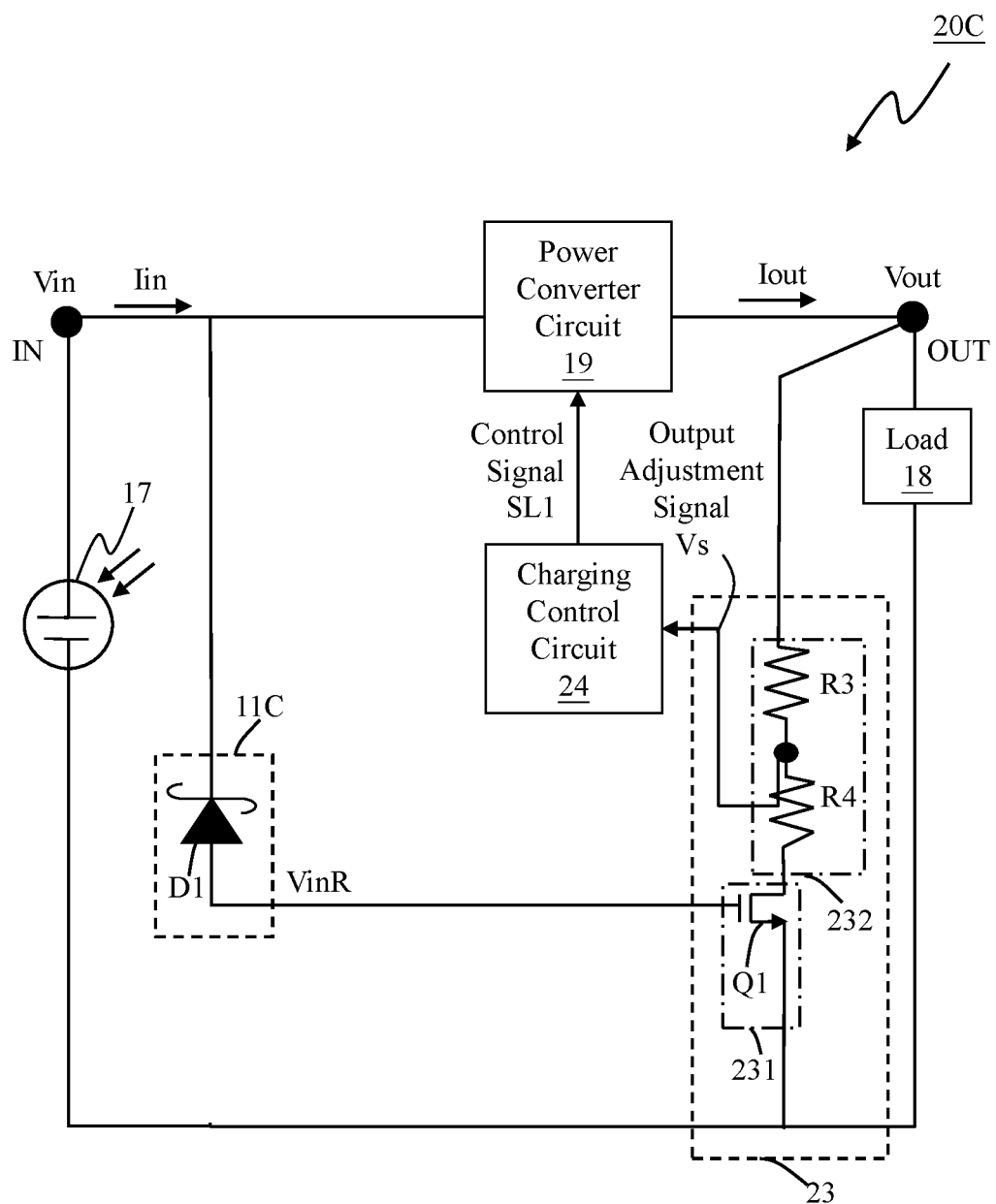
FIG. 13 shows an input voltage sense circuit according to another embodiment of the present invention, which operate under CV mode.

Please refer to FIG. 13. FIG. 13 shows an input voltage sense circuit according to another embodiment of the present invention, which operate under CV mode. This embodiment shows that the input voltage sense circuit 11 does not necessarily have to be a voltage divider circuit as shown in FIG. 11. In another embodiment as shown, the input voltage sense circuit 11C of the charger circuit 20C for example can be a Zener diode D1, for generating the input voltage related signal VinR according to the input voltage Vin.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. As an example, between two circuits or components shown to be directly connected with each other in the embodiments, a circuit or component which does not affect the primary function of the circuitry can be inserted, such as a switch, etc. For another example, it is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. Furthermore, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A charger circuit with temperature compensation function, having an input terminal configured to be coupled to a photovoltaic power module and an output terminal configured to be coupled to a load, wherein the charger circuit is configured to convert an input voltage provided by the photovoltaic power module at the input terminal to an output voltage at the output terminal, the charger circuit comprising:

a power converter circuit coupled between the input terminal and the output terminal, the power converter circuit being configured to convert the input voltage provided by the photovoltaic power module at the input terminal to the output voltage at the output terminal and supply an output current through the output terminal to the load;

an input voltage sense circuit coupled to the input terminal, the input voltage sense circuit being configured to generate an input voltage related signal according to the input voltage;

an output adjustment circuit coupled to the input voltage sense circuit, the output adjustment circuit being configured to generate an output adjustment signal according to the input voltage related signal; and a charging control circuit coupled between the power converter circuit and the output adjustment circuit, the charging control circuit being configured to generate a control signal according to the output adjustment signal, to adjust the output current supplied by the power converter circuit, wherein when the input voltage is smaller than a predetermined voltage threshold, the power converter circuit decreases the output current;

wherein the output adjustment circuit includes a switch which is configured to operate according to the input voltage related signal and the predetermined voltage threshold to determine the output adjustment signal, wherein the switch operates below its conduction threshold, so that the switch operates in its linear region, whereby a conduction level of the switch is in analog correlation with the input voltage related signal;

wherein the predetermined voltage threshold is correlated to the conduction threshold of the switch;

wherein the switch includes a PN junction which has a temperature coefficient that is correlated to a temperature coefficient of the photovoltaic power module, and the PN junction determines the conduction threshold of the switch;

wherein the temperature coefficient of the photovoltaic power module and the temperature coefficient of the PN junction of the switch of the output adjustment circuit are correlated with each other by a predetermined correlation relationship and when the switch of the output adjustment circuit operates, a temperature effect on the photovoltaic power module is compensated by the PN junction of the switch of the output adjustment circuit according to the predetermined correlation relationship.

2. The charger circuit according to claim 1, wherein the charging control circuit is configured to generate the control signal according to the output adjustment signal and further according to a level of the output current, to adjust the output current supplied by the power converter circuit.

3. The charger circuit according to claim 2, wherein the output adjustment circuit includes:

the switch configured to operate according to a relationship between the input voltage related signal and the predetermined voltage threshold; and an adjustment resistor set coupled to the switch and being configured to generate the output adjustment signal, wherein a resistance of the adjustment resistor set and the conduction level of the switch determine a level of the output adjustment signal.

4. The charger circuit according to claim 2, wherein the charging control circuit includes:

a signal amplifier circuit having one input coupled to the output adjustment circuit, the signal amplifier circuit being configured to amplify a difference between the output adjustment signal and a voltage reference, to output an output current reference; and an error amplifier circuit having one input coupled to an output of the signal amplifier circuit and another input configured to receive the output current, the error amplifier circuit being configured to amplify a difference between the output current reference and the output current to generate the control signal, for controlling the output current supplied by the power converter circuit.

5. The charger circuit according to claim 1, wherein the output adjustment circuit is further coupled to the output terminal, and is configured to generate the output adjustment signal according to the input voltage related signal and the output voltage.

6. The charger circuit according to claim 5, wherein the output adjustment circuit includes:

the switch configured to operate according to a relationship between the input voltage related signal and the predetermined voltage threshold; and an adjustment resistor set coupled to the switch and the output terminal, and being configured to generate the output adjustment signal, wherein a resistance of the adjustment resistor set, the conduction level of the switch and a level of the output voltage determine a level of the output adjustment signal, wherein the output adjustment signal is correlated to the output voltage.

7. The charger circuit according to claim 5, wherein the charging control circuit includes:

a signal amplifier circuit having one input coupled to the output adjustment circuit, the signal amplifier circuit being configured to amplify a difference between the output adjustment signal and a voltage reference, to generate the control signal for controlling the output current supplied by the power converter circuit.

8. The charger circuit according to claim 1, wherein when the input voltage provided by the photovoltaic power module at the input terminal is equal to or larger than the predetermined voltage threshold, the power converter circuit maintains the output current at a maximum.

9. The charger circuit according to claim 3, wherein the switch includes a MOS transistor or a BJT, the MOS transistor or BJT having the PN junction, such that the charger circuit compensates the temperature coefficient of the photovoltaic power module.

10. The charger circuit according to claim 3, wherein:

when the input voltage provided by the photovoltaic power module at the input terminal is smaller than the predetermined voltage threshold, an equivalent resistance of the switch is controlled so that the level of the output adjustment signal is determined by a sum of the resistance of the adjustment resistor set and the equivalent resistance of the switch, whereby the power converter circuit decreases the output current; and when the input voltage provided by the photovoltaic power module at the input terminal is equal to or larger than the predetermined voltage threshold, the equivalent resistance of the switch is controlled to be near zero so that the level of the output adjustment signal is determined by the resistance of the adjustment resistor set, whereby the power converter circuit maintains the output current at a maximum.

11. The charger circuit according to claim 6, wherein the switch includes a MOS transistor or a BJT, the MOS transistor or BJT having the PN junction.

12. The charger circuit according to claim 6, wherein:

when the input voltage provided by the photovoltaic power module at the input terminal is smaller than the predetermined voltage threshold, an equivalent resistance of the switch is controlled so that the level of the output adjustment signal is determined by a sum of the resistance of the adjustment resistor set and the equivalent resistance of the switch, whereby the power converter circuit decreases the output current; and when the input voltage provided by the photovoltaic power module at the input terminal is equal to or larger than the predetermined voltage threshold, the equivalent resistance of the switch is controlled to be near zero so that the level of the output adjustment signal is determined by the resistance of the adjustment resistor set, whereby the power converter circuit maintains the output current at a maximum.

13. The charger circuit according to claim 1, wherein the input voltage sense circuit includes at least two resistors connected in series, for generating the input voltage related signal according to the input voltage.

14. The charger circuit according to claim 1, wherein the input voltage sense circuit includes a Zener diode, for generating the input voltage related signal according to the input voltage.

15. A controller circuit of a charger circuit with temperature compensation function, the charger circuit having an input terminal configured to be coupled to a photovoltaic power module and an output terminal configured to be coupled to a load, wherein the charger circuit includes a power converter circuit coupled between the input terminal and the output terminal, for converting an input voltage provided by the photovoltaic power module at the input terminal to an output voltage at the output terminal and supplying an output current through the output terminal to the load, the controller circuit comprising:
an input voltage sense circuit coupled to the input terminal, the input voltage sense circuit being configured to generate an input voltage related signal according to the input voltage;
an output adjustment circuit coupled to the input voltage sense circuit, the output adjustment circuit being configured to generate an output adjustment signal according to the input voltage related signal; and
a charging control circuit coupled between the power converter circuit and the output adjustment circuit, the charging control circuit being configured to generate a control signal according to the output adjustment signal, to adjust the output current supplied by the power converter circuit;
wherein when the input voltage is smaller than a predetermined voltage threshold, the power converter circuit is controlled to decrease the output current;
wherein the output adjustment circuit includes a switch which is configured to operate according to the input voltage related signal and the predetermined voltage threshold to determine the output adjustment signal, wherein the switch operates below its conduction threshold, so that the switch operates in its linear region, whereby a conduction level of the switch is in analog correlation with the input voltage related signal;
wherein the predetermined voltage threshold is correlated to a conduction threshold of the switch;
wherein the switch includes a PN junction which has a temperature coefficient that is correlated to a temperature coefficient of the photovoltaic power module, and the PN junction determines the conduction threshold of the switch;
wherein the temperature coefficient of the photovoltaic power module and the temperature coefficient of the PN junction of the switch of the output adjustment circuit are correlated with each other by a predetermined correlation relationship and when the switch of the output adjustment circuit operates, a temperature effect on the photovoltaic power module is compensated by the PN junction of the switch of the output adjustment circuit according to the predetermined correlation relationship.

16. The controller circuit according to claim 15, wherein the charging control circuit is configured to generate the control signal according to the output adjustment signal and further according to a level of the output current, to adjust the output current supplied by the power converter circuit.

17. The controller circuit according to claim 16, wherein the output adjustment circuit includes:
the switch configured to operate according to a relationship between the input voltage related signal and the predetermined voltage threshold; and
an adjustment resistor set coupled to the switch and being configured to generate the output adjustment signal, wherein a resistance of the adjustment resistor set and the conduction level of the switch determine a level of the output adjustment signal.

18. The controller circuit according to claim 16, wherein the charging control circuit includes:
a signal amplifier circuit having one input coupled to the output adjustment circuit, the signal amplifier circuit being configured to amplify a difference between the output adjustment signal and a voltage reference, to output an output current reference; and
an error amplifier circuit having one input coupled to an output of the signal amplifier circuit and another input configured to receive the output current, the error amplifier circuit being configured to amplify a difference between the output current reference and the output current to generate the control signal, for controlling the output current supplied by the power converter circuit.

19. The controller circuit according to claim 15, wherein the output adjustment circuit is further coupled to the output terminal, and is configured to generate the output adjustment signal according to the input voltage related signal and the output voltage.

20. The controller circuit according to claim 19, wherein the output adjustment circuit includes:
the switch configured to operate according to a relationship between the input voltage related signal and the predetermined voltage threshold; and
an adjustment resistor set coupled to the switch and the output terminal, and being configured to generate the output adjustment signal, wherein a resistance of the adjustment resistor set, the conduction level of the switch and a level of the output voltage determine a level of the output adjustment signal, wherein the output adjustment signal is correlated to the output voltage.

21. The controller circuit according to claim 19, wherein the charging control circuit includes:
a signal amplifier circuit having one input coupled to the output adjustment circuit, the signal amplifier circuit being configured to amplify a difference between the output adjustment signal and a voltage reference, to generate the control signal for controlling the output current supplied by the power converter circuit.

22. The controller circuit according to claim 15, wherein when the input voltage provided by the photovoltaic power module at the input terminal is equal to or larger than the predetermined voltage threshold, the power converter circuit maintains the output current at a maximum.

23. The controller circuit according to claim 17, wherein the switch includes a MOS transistor or a BJT, the MOS transistor or BJT having the PN junction.

24. The controller circuit according to claim 17, wherein:
when the input voltage provided by the photovoltaic power module at the input terminal is smaller than the predetermined voltage threshold, an equivalent resistance of the switch is controlled so that the level of the output adjustment signal is determined by a sum of the resistance of the adjustment resistor set and the equivalent resistance of the switch, whereby the power converter circuit decreases the output current; and when the input voltage provided by the photovoltaic power module at the input terminal is equal to or larger than the predetermined voltage threshold, the equivalent resistance of the switch is controlled to be near zero so that the level of the output adjustment signal is determined by the resistance of the adjustment resistor set, whereby the power converter circuit maintains the output current at a maximum.

25. The controller circuit according to claim 20, wherein the switch includes a MOS transistor or a BJT, the MOS transistor or BJT having the PN junction.

26. The controller circuit according to claim 20, wherein:
when the input voltage provided by the photovoltaic power module at the input terminal is smaller than the predetermined voltage threshold, an equivalent resistance of the switch is controlled so that the level of the output adjustment signal is determined by a sum of the resistance of the adjustment resistor set and the equivalent resistance of the switch, whereby the power converter circuit decreases the output current; and when the input voltage provided by the photovoltaic power module at the input terminal is equal to or larger than the predetermined voltage threshold, the equivalent resistance of the switch is controlled to be near zero so that the level of the output adjustment signal is determined by the resistance of the adjustment resistor set, whereby the power converter circuit maintains the output current at a maximum.

27. The controller circuit according to claim 15, wherein the input voltage sense circuit includes at least two resistors connected in series, for generating the input voltage related signal according to the input voltage.

28. The controller circuit according to claim 15, wherein the input voltage sense circuit includes a Zener diode, for generating the input voltage related signal according to the input voltage.

* * * * *